Patented Dec. 9, 1941

2,265,847

UNITED STATES PATENT OFFICE 2,265,847

RESINS AND PROCESS FOR THEIR PREPARATION

Kenneth C. Laughlin and Simpson D. Sumerford, Baton Rouge, La., assignors to Standard Oil Development Company, a corporation of Delaware No Drawing. Application January 24, 1939, Serial No. 252,544

8 Claims. (Cl. 260—2)

This invention relates to the preparation of resins from aromatic hydrocarbons and alkyl dihalides and more particularly to the preparation of hard, brittle, soluble resins of improved color from petroleum fractions containing aromatic hydrocarbons and from similar aromatic compounds.

It is known that high molecular weight condensation products can be prepared from aromatic hydrocarbons and ethylene dichloride by heating in the presence of metal halide catalysts such as aluminum chloride. Such products range from viscous oils to insoluble, rubbery plastic solids.

It has now been found that by the proper control of reaction conditions, valuable soluble resins of light color and high melting point are obtained. These resins are solid, brittle products having softening points above 150° F. and are soluble in tung oil, linseed oil, turpentine, chloroform, methyl ethyl ketone, amyl acetate, ethylene dichloride and hydrocarbon oils such as toluol and 54° Bé. petroleum naphtha. They are insoluble in alcohol, ether, water and are not attacked by dilute acids or alkalis.

Methods have also been found for improving the color of such resins, principally by carrying out the condensation reaction until the appearance of a small amount of insoluble reaction products, continuing the reaction in the presence of the precipitate, and then separating improved resins from the soluble reaction products.

The following examples illustrate suitable methods for the preparation of improved resins by the process of this invention.

Example 1

A petroleum fraction boiling from 248° F. to 383° F. and containing mainly hydrocarbons of nine carbon atoms per molecule was obtained by fractionation of virgin Anahuac-Tomball crude. Inspections of this fraction show:

A. P. I. gravity_____ 47.7
Aniline point_____°F__ 114
Refractive index N20/D_____ 1.4394

This fraction was obtained as a side-stream from a crude distillation unit. No further treatment was employed.

This fraction contained about 25 to 30% of aromatic hydrocarbons. It was mixed with about 4 mols of ethylene dichloride ($ClCH_2CH_2Cl$) per mol of aromatic hydrocarbons in the petroleum fraction. Three per cent by weight (based on the aromatic hydrocarbons) of anhydrous aluminum chloride was then added and the mixture was heated with stirring in a closed vessel under a reflux condenser to a temperature of about 185 to 200° F. at which hydrogen chloride was evolved with refluxing of the reagents. The hydrogen chloride may be absorbed in water for use later as the hydrolyzing agent. After the heating was continued for some time (about 100 minutes) a resinous solid precipitated from the solution.

Heating of the total reaction mixture under reflux was continued for about 45 minutes after the appearance of the precipitate. The reaction was then stopped by adding about one-half volume of dilute (25% strength) aqueous hydrochloric acid in order to hydrolyze the aluminum chloride and to hold the aluminum salts in solution in the water layer. The heating was discontinued at this point but stirring was continued until the hydrolysis was complete. The mixture was then allowed to settle and the liquid was decanted from the solid insoluble mass. The decanted liquid separated into a water layer, which was discarded, and an oil layer, containing the soluble resin. This oil layer was washed several times with water to remove water soluble salts and acid (an aqueous caustic wash is even more effective for this purpose). The washed oil layer was then distilled to remove the excess ethylene dichloride and unreacted hydrocarbons. The distillation was continued at atmospheric pressure to a temperature of about 300° F. and was then continued at a vacuum of from 4 to 6 mm. absolute pressure to a temperature of about 425° F. The residue from this distillation was a hard, brittle, light-colored resin and was obtained in a yield of 15 to 20% by weight based on the original petroleum fraction.

This resin had a melting point of 187° F. and a light red color (R on the Rosin scale). It was transparent to light.

Example 2

A petroleum fraction of similar boiling range to that used in Example 1 was obtained by distillation of virgin Conroe-Raccoon Bend crude and was treated with ethylene dichloride in the presence of aluminum chloride under the same conditions described in Example 1. The resin recovered from this process had a melting point of 198° F. and was also light red in color and transparent to light.

If the reaction is stopped in the above-described process when the resinous solid precipitate first appears, or just before the appearance of the precipitate, the resin recovered from the liquid reaction mixture in the same manner described above has a much darker color than that obtained in the above examples. The continuance of the heating operation, preferably for about 30 to 45 minutes or 1 hour, after the appearance of this precipitate improves the color and quality of the soluble resin, without materially impairing the yield.

It is offered in explanation of the improvements obtained by this process that the resinous precipitate absorbs the color bodies from the soluble resin, or that the color bodies are preferentially polymerized to an insoluble form. In any case, the yield of the improved resin obtained by this process is substantially equal to the yield of the darker colored resins.

While the above examples illustrate suitable methods for carrying out the process of this invention, it is not limited to the specific conditions used therein, as variations in the nature of the reagents, catalysts and conditions are within the scope of this invention. Other aromatic hydrocarbons, such as toluene, xylene, aromatic crudes, and particularly distillate fractions thereof boiling above about 212° F. and up to 600° F. may also be used in place of the petroleum fractions in the above examples. The petroleum fractions may also be subjected to solvent extraction in order to secure concentrates of the aromatic hydrocarbons present therein and these solvent extracts may be used in the preparation of resins by the process of this invention. Similarly, petroleum fractions may be increased in aromatic content by catalytic reforming or by destructive hydrogenation, especially by hydro-forming, and the resulting products used in the preparation of resins by the process of this invention.

Other alkyl dihalides may be used in place of ethylene dichloride. These alkyl dihalides are preferably saturated, have a halogen connected to each end of the carbon chain and contain about 2 to 5 carbon atoms per molecule. The molal ratio of the alkyl dihalide to aromatics should be above about 3, and is preferably 4 or more. The use of smaller proportions of alkyl dihalides causes gelation and the formation of undesirable products. The presence of about 1 to 2 volumes (based on aromatics) of non-aromatic hydrocarbons is also desirable. The process of this invention may be conducted with the metal halide catalyst ordinarily used in the Friedel-Crafts synthesis, such as $FeCl_3$, $ZnCl_2$, and $SnCl_2$. The catalyst is used in small amounts, preferably about 1.5 to 5% by weight of the aromatic hydrocarbons.

The reaction is preferably carried out in the presence of non-aromatic hydrocarbon diluents, such as are present in the petroleum fractions described above. Additional diluents may be provided and are desired in the event that the petroleum fraction contains so high a concentration of aromatics as to render the reaction product too viscous to flow freely at the reaction temperature. The large excess of the alkyl dihalide reagents, particularly ethylene dichloride, is also desirable. The unreacted alkyl dihalide in such cases also acts as a diluent and a solvent for the desired resinous products. The unreacted alkyl dihalide may be recovered by fractionation.

These resins are hard, brittle, soluble resins which are valuable in the preparation of surface coating compositions such as paints and varnishes, and of solid, molded, pressed, or cast objects which may also contain plasticizing agents, pigments, fillers, and the like. These resins are essentially different in properties from the rubber-like, plastic, insoluble masses which are formed from pure benzol by reaction with ethylene dichloride and aluminum chloride under somewhat similar conditions.

This invention is not to be limited to any examples or theoretical explanations, all of which are presented herein solely for purpose of illustration, but is limited only by the following claims in which it is desired to claim all novelty insofar as the prior art permits.

We claim:

1. Process according to claim 8 in which said petroleum fraction comprises a distillate fraction boiling between about 212 and 600° F., of a virgin aromatic petroleum.

2. Process according to claim 8 in which said alkyl dihalide is a saturated alkyl dichloride of about 2 to 5 carbon atoms per molecule.

3. Process for preparing resins comprising bringing an aromatic petroleum distillate boiling above about 212° F. into reaction with at least 3 mols of an alkyl dihalide per mol of aromatic hydrocarbon in said petroleum fraction, in the presence of about 1 to 5% by weight of aluminum chloride, based on said aromatic hydrocarbons, and heating the resulting mixture under reflux until a precipitate appears and for a substantial time but not more than about 1 hour thereafter, separating said precipitate from the liquid reaction products and then separating a hard, brittle resin from solution in the liquid reaction products.

4. Process according to claim 3 in which the reaction mixture is heated for about 30 to 45 minutes after the appearance of a resinous precipitate and a resin of light color is separated from the reaction mixture.

5. Improved hard, brittle, light-colored resin having a melting point above about 150° F., soluble in vegetable oils, esters, ketones, and hydrocarbon solvents; insoluble in alcohol, ether, and water, and prepared by the process of claim 8.

6. Improved hard, brittle, light-colored resin having a melting point above about 150° F., soluble in vegetable oils, esters, ketones, and hydrocarbon solvents; insoluble in alcohol, ether, and water, and prepared by the process of claim 3.

7. Process according to claim 3 in which said alkyl dihalide is ethylene dichloride.

8. Process for preparing soluble resins comprising bringing an aromatic petroleum fraction boiling within the approximate limits of 212 and 600° F. into reaction with at least 3 mols of an alkyl dihalide per mol of aromatic hydrocarbons in said petroleum fraction, in the presence of about 1 to 5% by weight, based on said aromatic hydrocarbons, of a metal halide catalyst suitable for use in the Friedel-Crafts synthesis, at a reaction temperature of about 185 to 200° F. with evolution of hydrogen chloride, holding the resulting mixture of reagents and catalyst at said reaction temperature for a sufficient time to form a solution containing dissolved therein a hard, brittle resin and then separating the said dissolved resin from the said solution.

SIMPSON D. SUMERFORD.
KENNETH C. LAUGHLIN.